US010356428B2

(12) United States Patent
Thirumalai et al.

(10) Patent No.: US 10,356,428 B2
(45) Date of Patent: Jul. 16, 2019

(54) QUANTIZATION PARAMETER (QP) UPDATE CLASSIFICATION FOR DISPLAY STREAM COMPRESSION (DSC)

(71) Applicant: QUALCOMM Incorporated, San Diego, CA (US)

(72) Inventors: Vijayaraghavan Thirumalai, San Diego, CA (US); Natan Haim Jacobson, San Diego, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 15/092,407

(22) Filed: Apr. 6, 2016

(65) Prior Publication Data
US 2016/0301939 A1 Oct. 13, 2016

Related U.S. Application Data

(60) Provisional application No. 62/146,898, filed on Apr. 13, 2015.

(51) Int. Cl.
H04N 19/196 (2014.01)
H04N 19/176 (2014.01)
(Continued)

(52) U.S. Cl.
CPC ......... H04N 19/197 (2014.11); H04N 19/124 (2014.11); H04N 19/136 (2014.11);
(Continued)

(58) Field of Classification Search
None
See application file for complete search history.

(56) References Cited

U.S. PATENT DOCUMENTS 4,922,273 A 5/1990 Yonekawa et al.
5,398,078 A 3/1995 Masuda et al.
(Continued)

FOREIGN PATENT DOCUMENTS

EP 2348734 A1 * 7/2011 .......... H03M 7/4006
JP H05130433 A 5/1993
(Continued)

OTHER PUBLICATIONS

Walls F., et al., "VESA Display Stream Compression", Mar. 3, 2014 (Mar. 3, 2014), pp. 1-5, XP002751573, Retrieved from the Internet: URL: (http://www.vesa.org/wp-content/uploads/2014/04/VESA_DSC-ETP200);http://www.vesa.org/wp-content/uploads/2014/04/VESA_DSC-ETP200.; on-Nov. 27, 2015].
(Continued)

Primary Examiner — Tung T Vo
Assistant Examiner — Tyler B Edwards
(74) Attorney, Agent, or Firm — Knobbe, Martens, Olson & Bear, LLP

(57) ABSTRACT

Quantization parameter (QP) update classification techniques for display stream compression (DSC) are disclosed. In one aspect, a method for determining a quantization parameter (QP) value includes determining whether a current block includes a transition from a flat region to a complex region or is a flat block and determining whether a previous block includes a transition from a flat region to a complex region or is a flat block. The method may also include selecting a default technique or an alternative technique for calculating a QP adjustment value for the current block based on whether the previous and current blocks include a transition from a flat region to a complex region or are flat blocks.

28 Claims, 11 Drawing Sheets

(51) Int. Cl.
*H04N 19/16* (2014.01)
*H04N 19/137* (2014.01)
*H04N 19/152* (2014.01)
*H04N 19/124* (2014.01)
*H04N 19/184* (2014.01)
*H04N 19/136* (2014.01)
*H04N 19/14* (2014.01)

(52) U.S. Cl.
CPC ........... *H04N 19/137* (2014.11); *H04N 19/14* (2014.11); *H04N 19/152* (2014.11); *H04N 19/16* (2014.11); *H04N 19/176* (2014.11); *H04N 19/184* (2014.11)

(56) References Cited

U.S. PATENT DOCUMENTS

| | | | |
|---|---|---|---|
| 5,933,451 | A | 8/1999 | Ozkan et al. |
| 7,039,108 | B2 | 5/2006 | Bauer et al. |
| 8,363,717 | B2 | 1/2013 | Togita et al. |
| 8,451,891 | B2 | 5/2013 | Seok et al. |
| 8,611,416 | B2 | 12/2013 | Hwang et al. |
| 8,787,445 | B2 | 7/2014 | Pore et al. |
| 8,848,801 | B2 | 9/2014 | Lainema et al. |
| 8,867,613 | B2 | 10/2014 | Joshi |
| 8,891,619 | B2 | 11/2014 | Leontaris et al. |
| 8,897,365 | B2 | 11/2014 | Reddy et al. |
| 9,071,822 | B2 | 6/2015 | Raveendran et al. |
| 9,241,159 | B2 | 1/2016 | Nakayama |
| 9,445,110 | B2 | 9/2016 | Leontaris et al. |
| 9,473,792 | B2 | 10/2016 | Srinivasamurthy et al. |
| 9,479,786 | B2 | 10/2016 | Lu et al. |
| 9,538,190 | B2 | 1/2017 | Karczewicz et al. |
| 9,565,440 | B2 | 2/2017 | Li et al. |
| 9,571,828 | B2 | 2/2017 | Okawa et al. |
| 9,628,816 | B2 | 4/2017 | Ugur et al. |
| 9,661,329 | B2 | 5/2017 | Zhang et al. |
| 2001/0017942 | A1 | 8/2001 | Kalevo et al. |
| 2002/0009146 | A1 | 1/2002 | Hall et al. |
| 2004/0146103 | A1 | 7/2004 | Chang et al. |
| 2006/0126728 | A1 | 6/2006 | Yu et al. |
| 2006/0133481 | A1 | 6/2006 | Chujoh |
| 2006/0165170 | A1 | 7/2006 | Kim et al. |
| 2006/0280242 | A1* | 12/2006 | Ugur .................. H04N 19/176 375/240.03 |
| 2008/0031518 | A1 | 2/2008 | Song et al. |
| 2009/0046778 | A1* | 2/2009 | Lee .................. H04N 19/176 375/240.03 |
| 2011/0129162 | A1 | 6/2011 | Kim et al. |
| 2012/0026394 | A1 | 2/2012 | Maruyama |
| 2012/0082243 | A1 | 4/2012 | Baylon et al. |
| 2012/0314764 | A1 | 12/2012 | Tidemann et al. |
| 2014/0169480 | A1 | 6/2014 | Lachine et al. |
| 2014/0301460 | A1 | 10/2014 | Karczewicz et al. |
| 2014/0376621 | A1 | 12/2014 | Fukushima et al. |
| 2015/0237346 | A1 | 8/2015 | Symes et al. |
| 2016/0301933 | A1 | 10/2016 | Jacobson |
| 2016/0301950 | A1 | 10/2016 | Jacobson |
| 2016/0309149 | A1 | 10/2016 | Thirumalai et al. |

FOREIGN PATENT DOCUMENTS

| | | |
|---|---|---|
| JP | H05227525 A | 9/1993 |
| JP | H06245199 A | 9/1994 |
| JP | 2009177353 A | 8/2009 |
| JP | 2013138361 A | 7/2013 |
| KR | 20100035243 A | 4/2010 |
| KR | 20140109902 A | 9/2014 |
| WO | WO-199716029 A1 | 5/1997 |

OTHER PUBLICATIONS

International Search Report and Written Opinion—PCT/US2016/026490—ISA/EPO—dated Aug. 19, 2016.

VESA (Video Electronics Standards Association) "Display Stream Compression (DSC) Standard v1.1", VESA Standard, VESA, US, vol. V1.1, Aug. 1, 2014 (Aug. 1, 2014), pp. 1-125, XP008177954, Retrieved from the Internet: URL: http://www.vesa.org/vesa-standards/standards-summaries.

Mohsenian N., et al., "Single-Pass Constant and Variable-Bit-Rate MPEG-2 Video Compression", IBM Journal of Research and Development, International Business Machines Corporation, New York, NY, US, vol. 43, No. 4, Jul. 1, 1999 (Jul. 1, 1999), pp. 489-509, XP002216512, ISSN: 0018-8646.

Partial International Search Report—PCT/US2016/026490—ISA/EPO—dated Jun. 22, 2016.

Vetro A., et al., "Object-based Transcoding for Scalable Quality of Service," Circuits and Systems, 2000, Proceedings. ISCAS 2000 Geneva, The 2000 IEEE International Symposium on May 28-31, 2000, Piscataway, NJ, USA,IEEE, May 28, 2000 (May 28, 2000), vol. 4, pp. 17-20, XP010503526, DOI: 10.1109/ISCAS.2000.858677 ISBN: 978-0-7803-5482-1.

Walls F., et al., "BDC-1: A Robust Algorithm for Display Stream Compression", 2013 Picture Coding Symposium (PCS), IEEE, Dec. 8, 2013 (Dec. 8, 2013), pp. 434-437, XP032567035, DOI: 10.1109/PCS.2013.6737776 [retrieved on Feb. 11, 2014].

ITU-T H.265, Series H: Audiovisual and Multimedia Systems, Infrastructure of audiovisual services—Coding of moving video, High efficiency video coding, The International Telecommunication Union, Apr. 2015, 634 pp.

Richardson; The H.264 Advanced Video Compression Standard; Wiley; 2010; 2nd Edition; (Chapter 3-9) (Year: 2010), pp. 1-349.

\* cited by examiner

300

| Block A isFlat = True | Block B isFlat = False | Block C isFlat = False | Block D isFlat = False | Block E isFlat = True |

| Block A isFlat = True isFlatToComplex = False | Block B isFlat = False isFlatToComplex = True | Block C isFlat = False isFlatToComplex = False | Block D isFlat = False isFlatToComplex = False |

| Block A isFlat = False | Block B isFlat = True | Block C isFlat = True | Block D isFlat = False |

FIG. 7

QUANTIZATION PARAMETER (QP) UPDATE CLASSIFICATION FOR DISPLAY STREAM COMPRESSION (DSC)

INCORPORATION BY REFERENCE TO PRIORITY APPLICATION(S)

This application claims the benefit of U.S. Provisional Application No. 62/146,898, filed Apr. 13, 2015.

TECHNICAL FIELD

This disclosure relates to the field of video coding and compression, and particularly, to video compression for transmission over display links, such as display stream compression (DSC).

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices.

The Video Electronics Standards Association (VESA) has developed display stream compression (DSC) as a standard for display link video compression. The display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In one aspect, a method for determining a quantization parameter (QP) value comprises determining whether a current block includes a transition from a flat region to a complex region or is a flat block; determining whether a previous block includes a transition from a flat region to a complex region or is a flat block; and selecting a default technique for calculating a QP adjustment value for the current block in response to determining that the current block does includes at least one of a transition from a flat region to a complex region or is a flat block. The method may further include selecting an alternative technique for calculating the QP adjustment value for the current block in response to determining: i) that the current block does not include a transition from a flat region to a complex region or is not a flat block, and ii) that the previous block includes either a transition from a flat region to a complex region or is a flat block. The method may further include calculating the QP adjustment value for the current block via the selected technique and determining the QP value for the current block based on the QP adjustment value.

In another aspect, a method for determining a quantization parameter (QP) value for coding video data with a fixed rate buffer comprises determining whether a fullness of the buffer is (i) greater than or equal to a first upper fullness threshold, or (ii) less than or equal to a first lower fullness threshold; selecting a first technique for calculating a QP adjustment value for a current block in response to determining that the fullness of the buffer is greater than or equal to the first upper fullness threshold; selecting a second technique for calculating the QP adjustment value for the current block in response to determining that the fullness of the buffer is less than or equal to the first lower fullness threshold; calculating the QP adjustment value for the current block via the selected technique; and determining the QP value for the current block based on the QP adjustment value.

In another aspect, a device for determining a quantization parameter (QP) value comprises a memory configured to store video data including a previous block and a current block; and at least one processor circuit coupled to the memory and configured to: determine whether the current block includes a transition from a flat region to a complex region or is a flat block; determine whether the previous block includes a transition from a flat region to a complex region or is a flat block; select a default technique for calculating a QP adjustment value for the current block in response to determining that the current block does includes at least one of a transition from a flat region to a complex region or is a flat block; select an alternative technique for calculating the QP adjustment value for the current block in response to determining: i) that the current block does not include a transition from a flat region to a complex region or is not a flat block, and ii) that the previous block includes either a transition from a flat region to a complex region or is a flat block; calculate the QP adjustment value for the current block via the selected technique; and determine the QP value for the current block based on the QP adjustment value.

In yet another aspect, a device for determining a quantization parameter (QP) value for coding video data comprises a fixed rate buffer circuit; a memory configured to store the video data including a current block; and at least one processor circuit coupled to the memory and configured to: determine whether a fullness of the buffer circuit is (i) greater than or equal to a first upper fullness threshold, or (ii) less than or equal to a first lower fullness threshold; select a first technique for calculating a QP adjustment value for the current block in response to determining that the fullness of the buffer is greater than or equal to the first upper fullness threshold; selecting a second technique for calculating the QP adjustment value for the current block in response to determining that the fullness of the buffer is less than or equal to the first lower fullness threshold; calculating the QP adjustment value for the current block via the selected technique; and determining the QP value for the current block based on the QP adjustment value.

BRIEF DESCRIPTION OF THE DRAWINGS

FIG. 5 illustrates an example technique for calculating the QP.

FIG. 6 illustrates another example technique for calculating the QP.

FIG. 7 illustrates yet another example technique for calculating the QP.

DETAILED DESCRIPTION

Figure 1A:
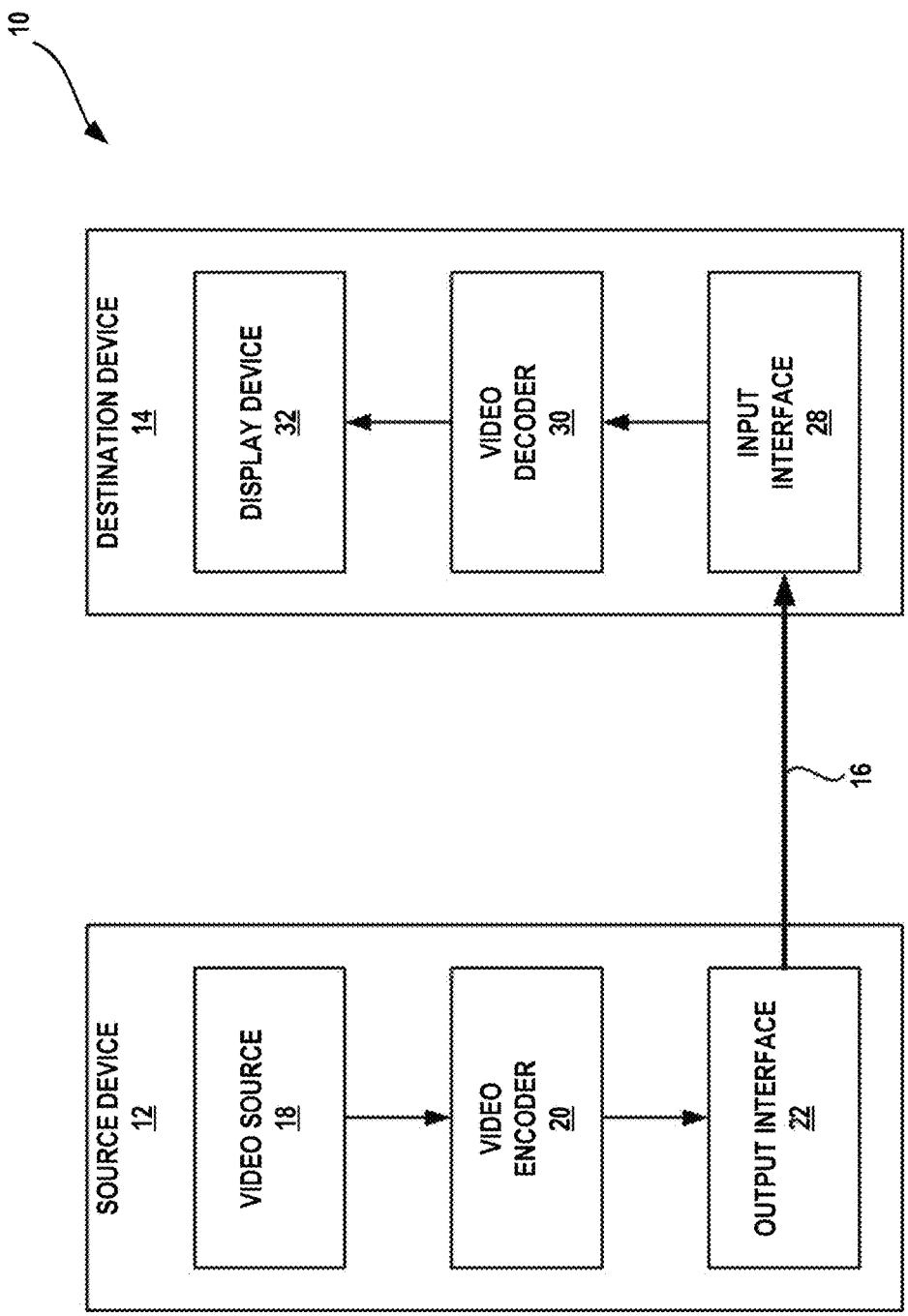
FIG. 1A is a block diagram illustrating an example video encoding and decoding system that may utilize techniques in accordance with aspects described in this disclosure.

In general, this disclosure relates to methods of improving video compression techniques such as display stream compression (DSC). More specifically, the present disclosure relates to systems and methods for improving the updating of a quantization parameter (QP) via the selection of an appropriate technique for calculating a QP adjustment value.

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. The techniques described herein may be particularly applicable to standards which incorporate a constant bit rate (CBR) buffer model. Also, the techniques described in this disclosure may become part of standards developed in the future. In other words, the techniques described in this disclosure may be applicable to previously developed video coding standards, video coding standards currently under development, and forthcoming video coding standards.

Video coding methods may calculate a QP value by updating a previously calculated QP value with a QP adjustment value. The QP adjustment value may be calculated based on a difference between a previous block and a current block, e.g., a difference between the bits required to code the previous block and the target number of bits in which to code the current block.

However, the QP adjustment value which is determined by conventional techniques may result in coding inefficiencies or may cause noticeable artifacts under certain circumstances. For example, conventional techniques for determining the QP adjustment value may not be aggressive enough for transitions from flat to complex regions of an image (e.g., the QP adjustment value may be smaller than a more desirable QP adjustment value which would result in better coding efficiency without noticeable artifacts). The concepts of flat and complex regions will be described in greater detail below.

Additionally, when the fullness of the buffer is within a threshold value of being empty or full, the conventional techniques for calculating the QP adjustment value may be too aggressive, resulting in artifacts in an image reconstructed by a decoder. For example, a QP adjustment value calculated by the conventional techniques may be larger than a more desirable QP adjustment value which would mask artifacts from being noticeable in the reconstructed image.

Accordingly, aspects of this disclosure are directed to solving at least the above-indicated problems. In certain aspects, this may be accomplished via the detection or determination of conditions which may be associated with the above-indicated problems, and applying one or more alternative techniques for calculating a QP adjustment value under the detected conditions.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
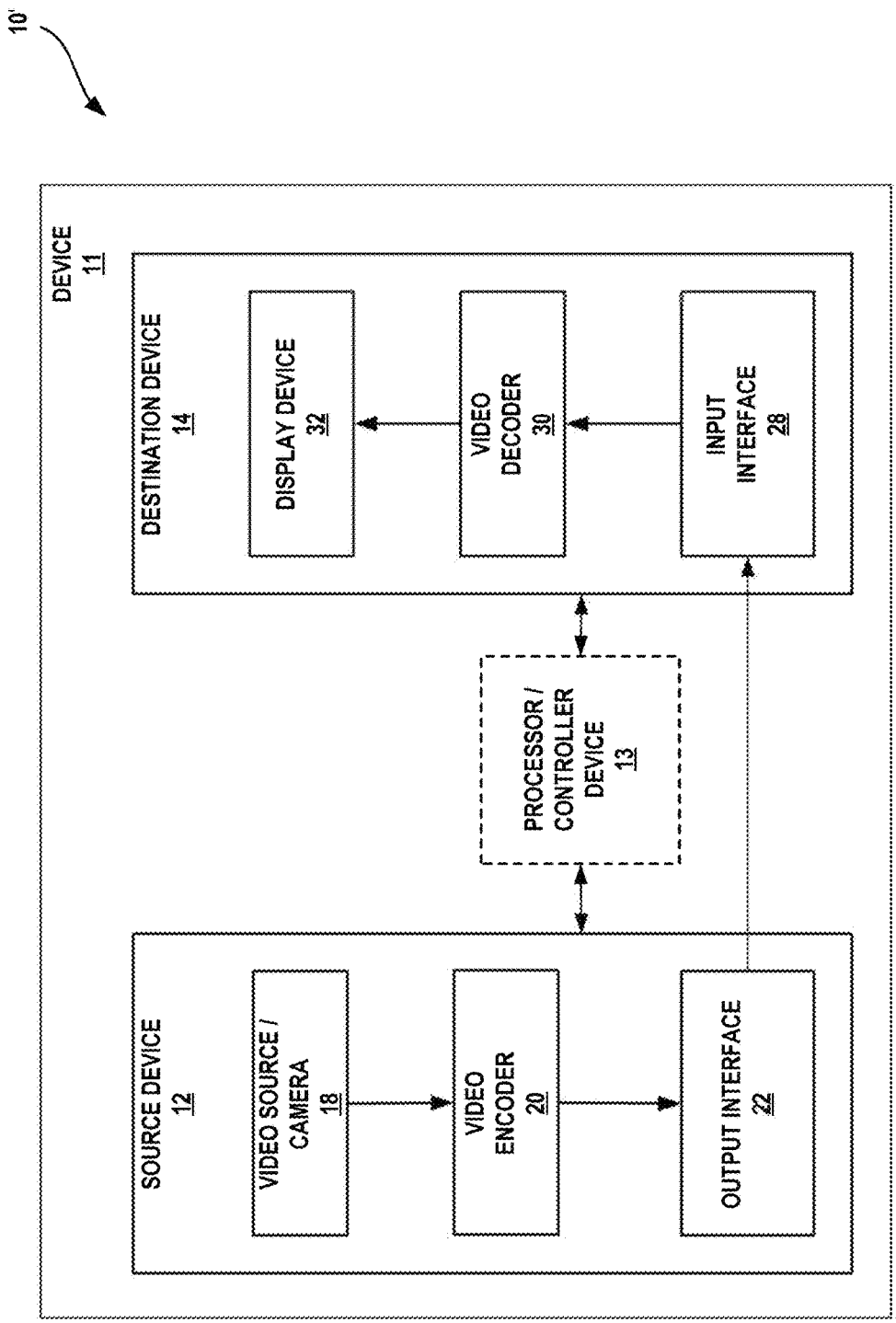
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, video streaming devices, devices that are wearable (or removeably attachable) by (to) an entity (e.g., a human, an animal, and/or another controlled device) such as eyewear and/or a wearable computer, devices or apparatus that can be consumed, ingested, or placed within an entity, and/or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated in FIG. 2B or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a QP. To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or each image or video frame may be encoded in several slices. In DSC, the target bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
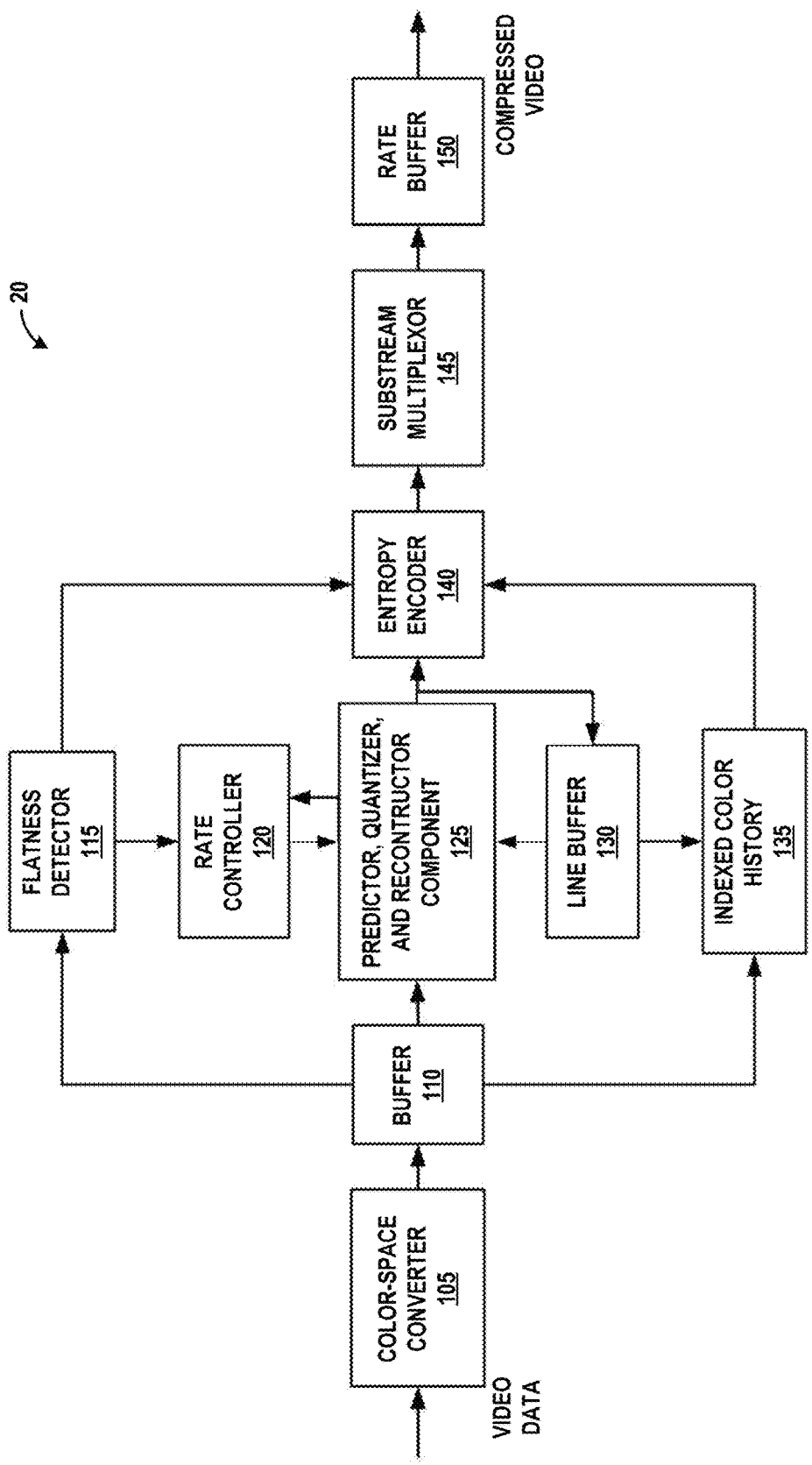
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer, 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space converter 105 may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCgCo) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a CBR buffer model is employed in which bits are taken out from the buffer at a constant bit rate. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the buffer and BufferMaxSize representing the size of the rate buffer 150, i.e., the maximum number of bits that can be stored in the rate buffer 150 at any point in time. The BF may be calculated as:

$$BF=((BufferCurrentSize*100)/BufferMaxSize)$$

It is noted that the above approach to calculating BF is merely exemplary, and that the BF may be calculated in any number of different ways, depending on the particular implementation or context.

The flatness detector 115 can detect changes from complex (i.e., non-flat) areas in the video data to flat (i.e., simple or uniform) areas in the video data, and/or vice versa. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. The term flat as used herein generally describes a region of the video data as being simple for the video encoder 20 to encoder and may, for example, include a smooth gradient in the video data, low spatial frequency, and/or other features which are simple to encode. The transitions from complex to flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified. Similarly, transitions from flat to complex regions may be used by the video encoder 20 to increase the QP in order to reduce the expected rate required to code a current block.

The rate controller 120 determines a set of coding parameters, e.g., a QP. The QP may be adjusted by the rate controller 120 based on the buffer fullness of the rate buffer 150 and image activity of the video data (e.g., a transition from complex to flat regions or vice versa) in order to maximize picture quality for a target bitrate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that it satisfies the bit-rate constraint, i.e., the overall actual coding rate fits within the target bit rate. Thus, one purpose of the rate controller 120 is to determine a set of coding parameters, such as QP(s), coding mode(s), etc., to satisfy instantaneous and average constraints on rate while maximizing rate-distortion performance.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels in the line above or to the left in the same line. In some embodiments, the video encoder 20 and the video decoder 30 may both perform an identical search on reconstructed pixels to determine the block prediction usages, and thus, no bits need to be sent in the block prediction mode. In other embodiments, the video encoder 20 may perform the search and signal block prediction vectors in the bitstream, such that the video decoder 30 need not perform a separate search. A midpoint prediction mode may also be implemented in which samples are predicted using the midpoint of the component range. The midpoint prediction mode may enable bounding of the number of bits required for the compressed video in even the worst-case sample.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
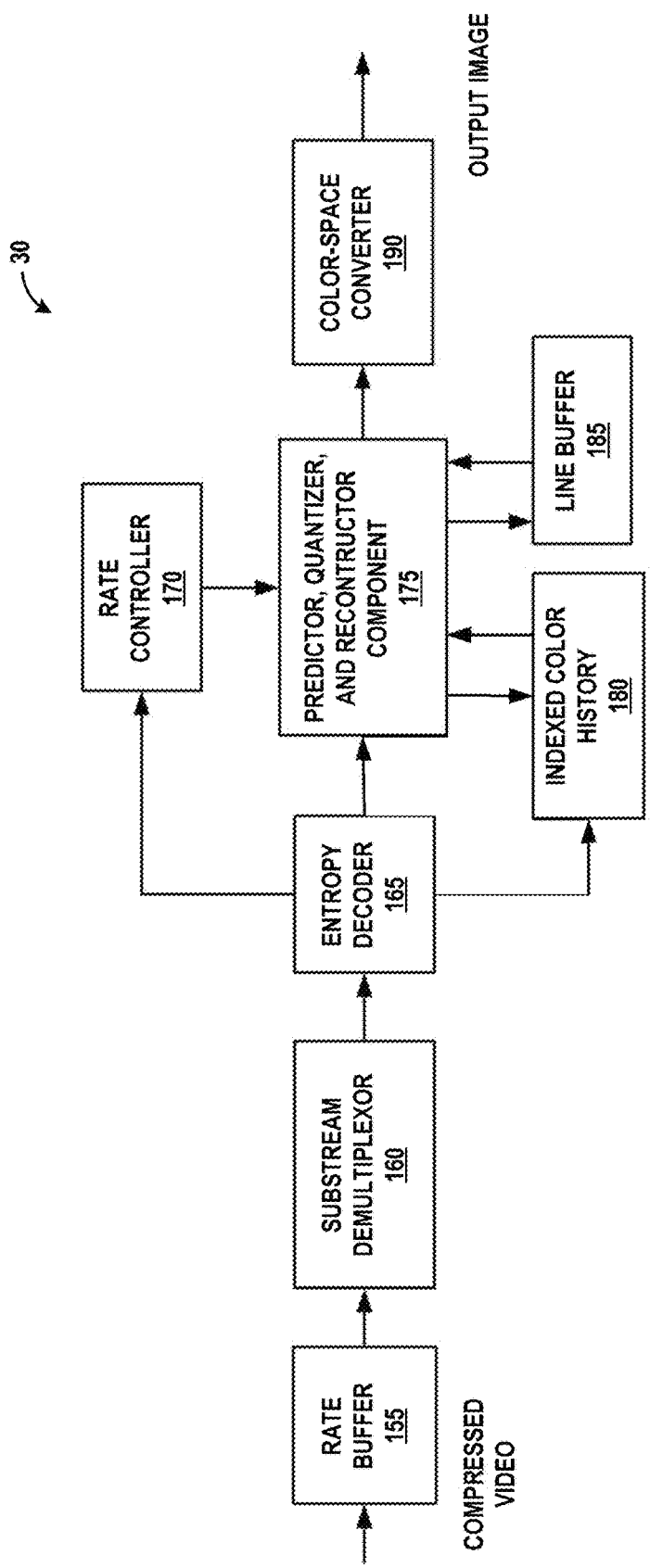
FIG. 2B is a block diagram illustrating an example of a video decoder that may implement techniques in accordance with aspects described in this disclosure.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video decoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

QP Calculation

In one approach, the QP for the current block (denoted as currQP) may be derived or calculated using the following equation:

$$currQP = prevQ + QpAdj * (diffBits > 0 ? 1 : -1),$$

where prevQP is the QP associated with the previous block, diffBits represents the difference between the previousBlockBits and targetBits, QpAdj is the QP offset value (e.g., QP adjustment value) that is calculated based on the magnitude of diffBits, previousBlockBits represents the number of bits used to code the previous block, and targetBits represents a target number of bits allocated to code the current block. When previousBlockBits>targetBits, diffBits is positive, and the current block QP may be derived by adding the offset value QpAdj to the prevQP value. In other words, the QP value does not decrease in value from the prevQP value when diffBits is positive. When previousBlockBits<targetBits, diffBits is negative or zero, and currQP does not increase from the prevQP value. It is noted that the offset value QpAdj may be calculated, for example, as a function of diffBits in such a way that QpAdj monotonically increases as the magnitude of diffBits increases.

Figure 3:
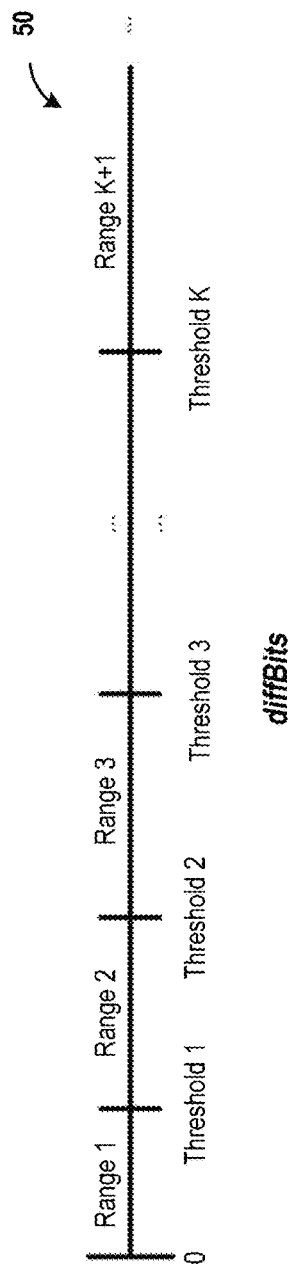
FIG. 3 shows an example approach to determining quantization parameter (QP) adjustment value(s).

One technique, referred to herein as a default technique, for calculating the QP adjustment value QpAdj will now be described with reference to FIG. 3. FIG. 3 provides a graph 50 including an axis on which values of diffBits starting a zero are plotted. In the default technique, when diffBits>0, diffBits may be classified into K+1 ranges using K threshold values. These threshold values are illustrated by the labels Threshold 1, Threshold 2, Threshold 3, . . . , and Threshold K and the ranges are illustrated by the labels Range 1, Range 2, Range 3, . . . , and Range K+1. In the default technique of FIG. 3, there is shown one approach to segmenting diffBits into K+1 ranges using K threshold values. Each range may be associated with a specific QpAdj value, where the QpAdj value increases as the range index increases. When diffBits<0, the absolute value of diffBits may be classified into J+1 ranges using J threshold values (not illustrated), and there may be a specific QpAdj value assigned for each of the J+1 ranges.

In other aspects, the currQP value may be adjusted based on the fullness of the buffer (which may be represented in terms of buffer fullness BF), in order to prevent underflow and/or overflow of the buffer. In particular, when BF exceeds a certain threshold (e.g., $P_1$), currQP may be incremented by a fixed offset value (e.g., $p_1$). For example, currQP may be adjusted as follows: currQP+=$p_1$. Further, when BF falls below a certain threshold (e.g., $Q_1$), currQP may be decremented by $q_1$, e.g., currQP-=$q_1$. In certain aspect, a plurality of thresholds may be employed, and for each threshold there may be a corresponding offset value to adjust currQP.

Finally, when a transition from a complex region to a flat region is identified or when a flat region is identified, the currQP may be set to a low value (e.g., a value below a defined currQP value).

Figure 4:
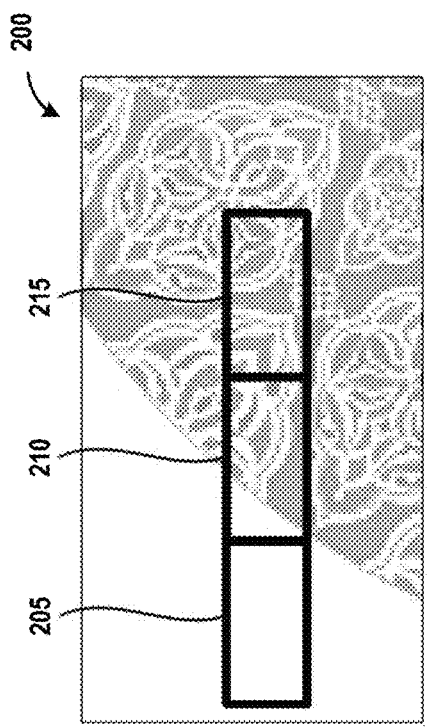
FIG. 4 illustrates an example transition from a flat region to a complex region within an image.

Techniques for Determining a Quantization Parameter (QP) Based on Flat to Complex Region Detection With reference to FIG. 4, one or more techniques may be utilized to detect a transition from a flat/smooth region to a complex region for DSC. Regardless of which technique is used to detection a transition to a complex region, when such a transition is detected, the QP used may be increased (compared to the previous flat block) at the transition block or the next block after the transition block in order to reduce the expected rate required to code the current/next block. It is noted, however, that the QP value at the transition block cannot be too high (e.g., exceeding a defined QP value), as the transition block contains both flat and complex regions. For example, when the QP value for a transition block exceeds a defined QP value, artifacts may be generated in the flat potion of the block which may be noticeable within an image reconstructed from the transition block.

FIG. 4 illustrates an example region of interest 200 which may be a frame or portion thereof, such as, for example, a slice of the frame. The region 200 may include and three successive blocks 205, 210, and 215. In this example, block 205 corresponds to a flat region/portion of the region 200, block 210 corresponds to a transition region/portion of the region 200, and block 215 corresponds to a complex region/portion of the region 200. As shown, the content of block 205 is flat, smooth, or uniform. The content of block 215 is textured and exhibits patterns that are not uniform throughout. The block 210 includes a transition from uniform to non-uniform content. As described below, a complexity calculation made be performed for each of the blocks 205, 210, and 215.

As used herein, a flat block may refer to a block which has a complexity value that is lower than a complexity threshold. The threshold at which a block is determined to be flat may be set based on various design criteria such as the number of bits required to code the block. Similarly, a non-flat or complex block may refer to a block which is not flat, e.g., has a complexity value which is greater than or equal to the complexity threshold. Various other categorizations of blocks may be employed based on the associated complexities of the blocks, and such categorizations may be ranges defined by thresholds in the complexity values of the blocks.

The terms flat and complex may also apply to regions other than blocks. In this case, although the regions may not be the same size as a block, e.g., the regions may not be a size which is discretely encoded/decoded, regions may also be categorized as flat or complex based on a complexity of the region. For example, a region may be referred to as a flat region if each block within that region is a flat block. However, a flat region may not have the same boundary as the block contained therein, and may the complexity of the region may be calculated over the entire region. Complex regions may be defined similarly. Thus, a region may be categorized as flat or complex by comparing a complexity value for the region to a complexity threshold, which may be different from the complexity threshold for blocks. Further, since regions may be divided into blocks for coding, the term region may be used herein conceptually to facilitate the understanding of various aspects of this disclosure.

As described above, in order to categorize a block as flat or complex, a complexity value for the block may be determined. The complexity value for a block may be determined according to various techniques, as long as the complexity value is representative of the difficulty of encoding the block, e.g., the number of bits that may be required to code the block without introducing visible artifacts. In one aspect, the complexity of a block may be calculated by taking a frequency transform (e.g., a discrete cosine transform (DCT), Hadamard transform, etc.) of the pixels in the block. The frequency transform may result in a number of frequency coefficients which may be summed to generate the complexity value. In certain aspects, the direct current (DC or zero-frequency) coefficient and/or one or more low frequency coefficients may not be included in the sum. Various other techniques for determining the complexity value, such as applying a color transformation before the frequency transform, may also be applied.

As discussed above under the section "QP Calculation", when the current block is a flat block or a block which contains a transition from a flat to a complex region, currQP may be decreased to a low value (e.g., a value below a defined currQP value). When the next block is not flat, currQP may be increased or decreased depending on the magnitude of diffBits. For example, when that the encoder is processing a region which contains highly textured or high frequency content (e.g., a complex region), when a flat block is located within this region, the encoder may decrease the QP value. Starting with the block following the flat block, the encoder may once again increase the QP value due to the high complexity of the region. However, since the QP value is decreased to a low value at the flat block, it may take a number blocks to return to a high QP value that is desirable for this high complexity region. In other words, the rate at which the QP value is updated may not sufficiently aggressive to prevent bits from being wasted, e.g., the coding of the complex blocks with the lower than desirable QP value may require a greater number of bits that necessary in order to maintain the required coding quality.

Furthermore, as also mentioned in the section "QP Calculation", currQP may be further incremented or decremented by a fixed offset value based on the fullness of the buffer. Incrementing or decrementing the QP value by a fixed value may not be desirable as the currQP may be incremented or decremented by a relatively large value (e.g., a value larger than a threshold) which may cause big difference(s) in the QP values between the consecutive blocks. This may result in noticeable artifacts in the reconstructed image.

The techniques disclosed herein may be applied to any image or video coder that utilizes or implements rate-control with CBR buffer, and may be used to address at least the two issues described above.

QP Update Technique Upon Detecting Flat Regions

In one approach, a variable isFlat may indicate whether a given block B is a flat block. Another variable isFlatToComplex may indicate whether a given block B contains transition from flat to complex region. Depending on the implementation, the encoder 20 or decoder 30 may explicitly determine the variable isFlat and/or isFlatToComplex for each block B, however, the encoder 20 or decoder 30 may also implicitly determine whether the block B is flat or includes a transition from a flat region to a complex region without explicitly determining the variables isFlat and/or isFlatToComplex. For the sake of clarity, this disclosure will discuss these variables as though they are determined by the encoder 20 and/or decoder 30.

In one implementation, alternative techniques (e.g., aggressive techniques) may be used to ramp or update the QP value when isFlat for the previous block is true and isFlat for the current block is false. That is, when the previous block is flat and the current block is complex, the encoder 20 and/or decoder 30 may infer than the current block includes a transition from a flat region to a complex region and apply an alternative technique for updating the QP value in place of the default technique.

One condition under which an alternative technique may be applied is when, for the previous block isFlat is true and for the current block isFlat is false. At this position (e.g., at the current block), the alternative technique (which may also be referred to as technique-F herein) may be utilized instead of the default technique to calculate QpAdj. The default technique is described above in connection with FIG. 3. It is noted that there may be one or more techniques that are alternative to the default technique.

In one example, the alternative technique may be used for N consecutive blocks, e.g., for N consecutive blocks QpAdj is calculated or determined based on technique-F and after coding N blocks, the rate control may switch back to the default technique. Here, N is a positive integer.

In another example, if any one of the blocks is found to be flat among the next N consecutive blocks, the rate control may switch back to default technique or set the QP to low value. Accordingly, technique-F may be applied for N consecutive blocks or until detecting/hitting a flat block among the N consecutive blocks, whichever occurs first.

FIG. 5 illustrates an example including a plurality of blocks 300, including Blocks A-E, where N=5. In this scenario shown in FIG. 5, since Block E is flat, technique-F is used for blocks B, C and D, i.e., only for 3 blocks.

The following example pseudo code in Table 1 shows an implementation which may be used to determine a QP update technique:

TABLE 1

Let isCurBlockFlat be a variable that represents whether isFlat for the current block is true or false;
distCount: is a variable that is reset to zero when isCurBlockFlat = true; otherwise, i.e., isCurBlockFlat = false, it is incremented by 1.
```
If(!isCurBlockFlat)
{
  distCount += 1;
  if(distCount <= N)
  {
    Technique-F is used to calculate QpAdj
  }
  else
  {
    Default technique is used to calculate QpAdj
  }
}
else
{
  distCount = 0;
}
```

In one alternative technique, when isFlat is true for the previous block and the current block has a transition from flat to complex region, technique-F may not be applied immediately to calculate the QP for the current block. Instead the alternative technique may be applied starting from the next block. An example of this scenario is shown in FIG. 6, which includes a plurality of block 310, including Blocks A-D. In the example of FIG. 6, for Block A isflat=true, and for Block B isflat=false (therefore, Block B contains a transition from flat region to complex region, e.g., isFlatToComplex=true). Under these conditions, the alternative technique may be used to calculate the QP starting from Block C.

Accordingly, the following example pseudo code of Table 2 may be used to determine a QP update technique:

TABLE 2

```
If(!isCurBlockFlat)
{
  distCount += 1;
  If(!isCurBlockFlatToComplex)
  {
    if(distCount <= N)
    {
      Technique-F is used to calculate QpAdj
    }
    else
    {
      Default technique is used to calculate QpAdj
    }
  }
}
```

TABLE 2-continued

```
  }
}
else
{
  distCount = 0;
}
```
Here, isCurBlockFlatToComplex is a variable that represents whether current block has transition from flat to complex region.

In another alternative, alternative techniques may be utilized to ramp or update the QP, when (isFlat||isFlatToComplex) for the previous block is true and (isFlat isFlatToComplex) for the current block is false, e.g., the previous block is either a flat block or contains transition from flat to complex region and the current block is not a flat block and does not contain a transition from flat region to a complex region.

In yet another alternative, among N consecutive blocks for which the alternative technique is applied, if any one of the block is flat or contains a transition from a flat to a complex region, the rate control may switch back to the default technique.

Accordingly, the following example pseudo code in Table 3 may be used to determine the technique to be implemented:

TABLE 3 distCountNew: is a variable that is reset to zero when (isCurBlockFlat| |isCurBlockFlatToComplex) = true; otherwise, i.e., (isCurBlockFlat| |isCurBlockFlatToComplex) = false, it is incremented by 1.
```
If(!isCurBlockFlat| |isCurBlockFlatToComplex))
{
  distCountNew += 1;
  if(distCountNew <= N)
  {
    Technique-F is used to calculate QpAdj
  }
  else
  {
    Default technique is used to calculate QpAdj
  }
}
else
{
  distCountNew = 0;
}
```

In another alternative, alternative techniques may be utilized to ramp or update the QP, when (isFlatToComplex) for the previous block is true and (isFlatToComplex) for the current block is false, e.g., regardless of whether the previous block is flat or not, the decision to choose a particular QP technique is based on isFlatToComplex.

In another alternative, among N consecutive blocks for which the alternative technique is applied, if any one of the blocks is found to contain a transition from a flat region to a complex region, the rate control may switch back to the default technique.

Accordingly, the following example pseudo code in Table 4 may be used to determine the technique to be implemented:

TABLE 4

DCount: is a variable that is reset to zero when (isCurBlockFlatToComplex) = true; otherwise, i.e., .
(isCurBlockFlatToComplex) = false, it is incremented by 1

TABLE 4-continued

```
If(!isCurBlockFlatToComplex)
{
    DCount += 1;
    if(DCount <= N)
    {
        Technique-F is used to calculate QpAdj
    }
    else
    {
        Default technique is used to calculate QpAdj
    }
}
else
{
    DCount = 0;
}
```

In one approach, the QP value of the block just before detecting isFlat=true may be stored, and the stored QP value may be used to derive the QP value of the block when isFlat=false. In this implementation, the complexity of a block prior to a flat region may be used to estimate the complexity of a block following the flat region. FIG. 7 includes a plurality of block 320 including Blocks A-D and illustrates a scenario where the QP value of block A may be used to derive the QP value for block D according to the current approach.

In one aspect, the QP value for block D may be the same as the QP value for block A. In another aspect, the QP value for block D may be adjusted based on technique-F. In yet another aspect, the QP value for block D may be adjusted based on default technique. In still another aspect, the QP value for block A may be incremented by a fixed offset and may be used as a QP value for block D.

In another aspect, the QP value for block A may be decremented by a fixed offset and may be used as a QP value for block D.

In another approach, the pseudo code line: distCount<=N, in each of Tables 1-4 may be replaced by the pseudo code line: distCount<N. In yet another approach, N can be replaced by N−1.

In accordance with one embodiment, the calculation of QpAdj for two regions (i) diffBits>0 and (ii) diffBits<=0 is described below.

Case (i): diffBits>0

Figure 8:
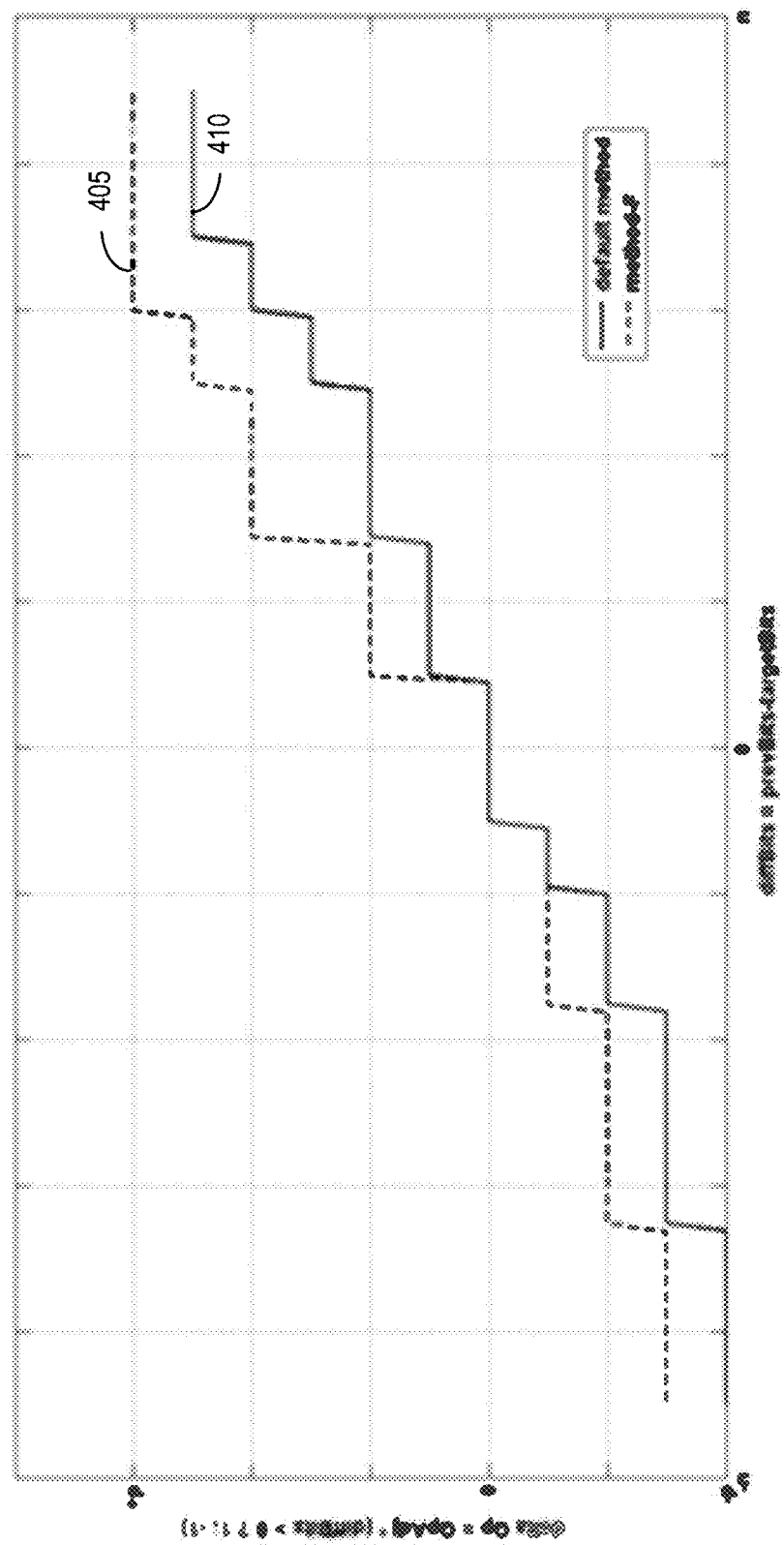
FIG. 8 shows an example approach to calculating a QP adjustment value.

In one implementation, for a given value of diffBits, the QpAdj value for Technique-F is strictly greater than (>) the corresponding QpAdj value for the default technique. FIG. 8 shows an illustration of one implementation of the default technique and an alternative technique. The graph of FIG. 8 includes two lines, the default technique 410 and the alternative technique 405. In the example of FIG. 8, delta Qp is shown as a function of diffBits for the default technique 410 and technique-F, e.g., the alternative technique 405. For technique-F 405, for a given diffBits>0, the QpAdj value (or delta Qp) for technique-F 405 is greater than or equal to the corresponding QpAdj value (or delta Qp) of the default technique 410. It is noted that the value of QpAdj may be the same when the functions overlap, e.g., where the solid line and dashed line functions overlap.

In one implementation, when the same threshold K values are used to classify K+1 ranges as used in the default technique 410 (as described above in connection with FIG. 3), for each range, QpAdj for Technique-F 405 may be strictly greater than the corresponding QpAdj value of the default technique 410.

With reference once again to the example of FIG. 8, the same threshold values may be used to classify the ranges (x-axis) for both techniques. In one alternative, strictly greater than (>) may be replaced by greater than or equal to (>=).

Case (ii): diffBits<=0

In one implementation, for a given value of diffBits, the QpAdj values for technique-F 405 are strictly smaller than the corresponding QpAdj value for the default technique 410. As shown in FIG. 8, for a given value of diffBits<=0, QpAdj (or |delta Qp|) for technique-F 405 is strictly less than the corresponding QpAdj (or |deltaQp|) for the default technique 410. More precisely, when diffBits<=0 (e.g., previousBlockBits<=targetBits), for technique-F 405, the QP for the current block currQP=prevQP−QpAdj is decreased more conservatively when compared to the default technique 410. This will save a few bits, since QP is not immediately decreased to a low value.

In one aspect, when the same J threshold values are used to classify J+1 ranges as used in the default technique 410, for each range, QpAdj (or |delta Qp|) for technique-F 405 is strictly smaller than the corresponding QpAdj value of the default technique 410. With continued reference to the example shown in FIG. 8, the same threshold values may be used to classify the ranges. In related aspects, strictly less than (<) can be replaced by less than or equal to (<=).

It is noted that the example shown in FIG. 8 is merely for illustrative purposes, and that the actual relation between diffBits and delta Qp for each technique may be different depending on the particular implementation or context.

In one aspect, for diffBits<=0, the default technique 410 may be used to calculate QpAdj, and for diffBits>0, the technique-F 405 may be used to calculate QpAdj. In related aspects, for diffBits>0, the default technique 410 may be used to calculate QpAdj, and for diffBits<=0, the technique-F 405 may be used to calculate QpAdj.

QP Update Technique when Buffer Exceeds or Falls Below the Upper and Lower Threshold Limits When BF exceeds an upper threshold limit, instead of using the default technique to calculate the QpAdj and then adding fixed offset value, alternative technique(s) may be used to calculate the QpAdj. In other words, QpAdj may be calculated via alternative technique(s) based on BF and diffBits. An analogous adjustment may be implemented when BF falls below a lower threshold.

Buffer Fullness Exceeds Threshold Limit

Let $[P_1, P_2, \ldots P_n]$ be n threshold values and [technique-P technique-$P_2$, ... technique-$P_n$] be the respective alternative techniques that may be used to calculate the QpAdj. The rate control may select a particular technique from the alternative techniques based on the following and the selected technique will be used to calculate QpAdj:

```
If(buffer fullness >= P1)
    technique-P1 is used to calculate QpAdj;
else if(buffer fullness >= P2)
    technique-P2 is used to calculate QpAdj;
...
else if(buffer fullness >= Pn)
    technique-Pn is used to calculate QpAdj.
```

That is, the fullness of the buffer, e.g., BF, may be compared to a plurality of progressively decreasing thresholds $P_1$ to $P_n$. When BF is greater than one of the thresholds, e.g., $P_i$, the corresponding technique, technique-$P_i$, may be used to determine the QP adjustment value, QpAdj.

Case (i): diffBits>0

In one implementation, for a given value of diffBits, the QpAdj value for technique-$P_1$>=the QpAdj value for technique-$P_2$>= . . . the QpAdj value for technique-$P_n$>=the QpAdj value for the default technique.

Figure 9:
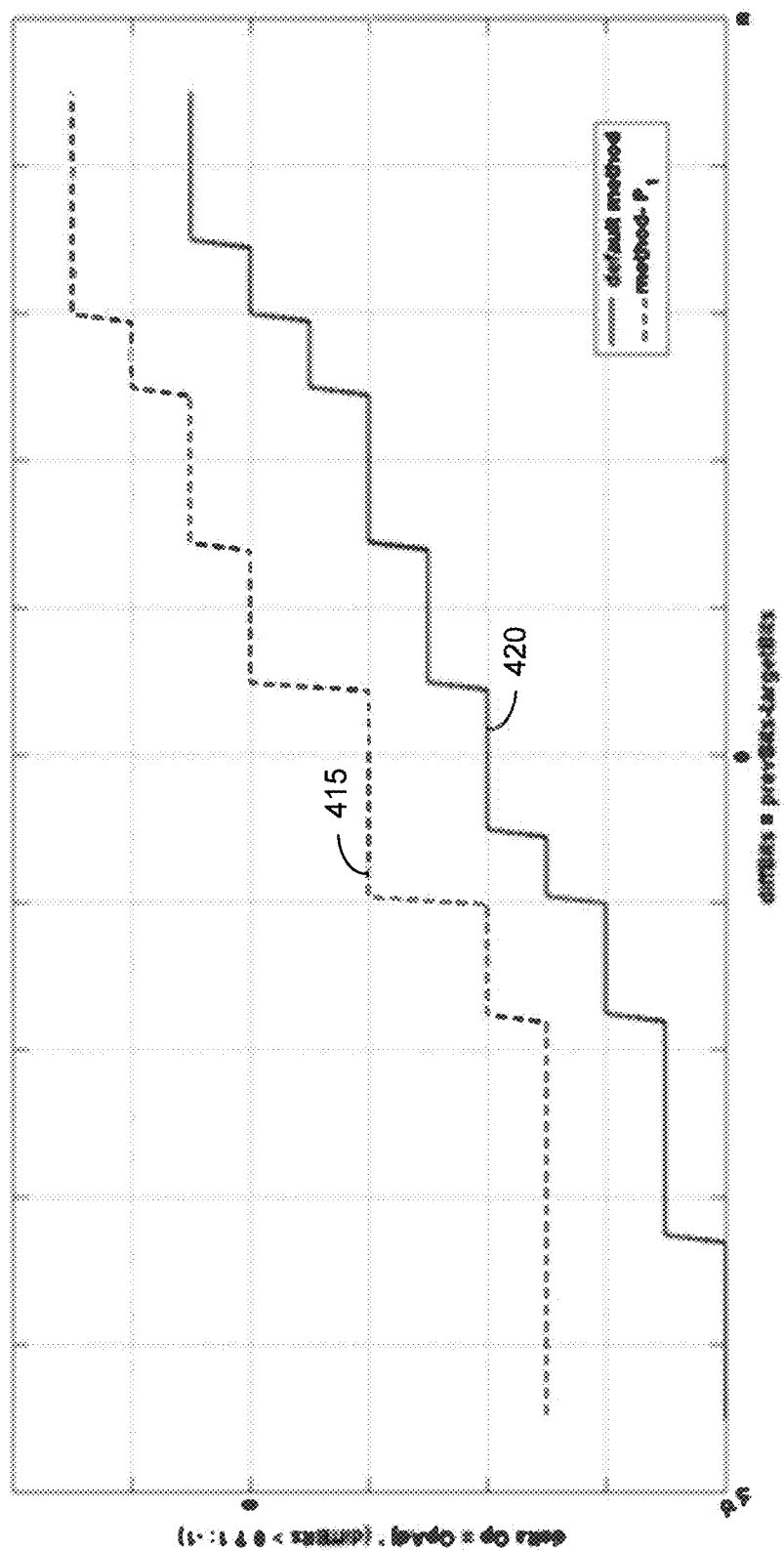
FIG. 9 shows another example approach to calculating the QP adjustment value.

FIG. 9 shows an illustration of one implementation of the default technique and an alternative technique, technique-$P_1$. The graph of FIG. 9 includes two lines, the default technique 420 and technique-P1 415, where for a given value of diffBits>0, the QpAdj value for technique-$P_1$ 415 is >=the QpAdj value for the default technique 420.

In one implementation, the same K threshold values may be used to classify K+1 ranges as used in the default technique 420 (as described above in connection with FIG. 3), for each range, the QpAdj value for technique-$P_1$ 415>=the QpAdj value for technique-$P_2$>= . . . the QpAdj value for technique-$P_n$>=the QpAdj value for default technique 420.

In one aspect, with reference to the example of FIG. 9, the same threshold values may be used to classify the ranges. In another aspect, greater than or equal to (>=) may be replaced by strictly greater than (>). In yet another aspect, the default technique 420 may be the sole technique used to calculate QpAdj.

Case (ii): diffBits<=0

In one implementation, for a given value of diffBits, the QpAdj value for technique-$P_1$ 415<=the QpAdj value for technique-$P_2$<= . . . the QpAdj value for technique-$P_n$, the QpAdj value for default technique 420.

With continuing reference to the example of FIG. 9, for a given value of diffBits<=0, QpAdj (or |delta Qp|) for technique-$P_1$ 415 is strictly smaller when compared to the corresponding QpAdj (or |deltaQp|) for the default technique 420.

In one implementation, the same threshold J values may be used to classify J+1 ranges as used in the default technique 420, and for each range, the QpAdj value for technique-$P_1$ 415<=the QpAdj value for technique-$P_2$<= . . . the QpAdj value for technique-$P_n$<=the QpAdj value for default technique 420.

In one aspect, less than or equal to (<=) may be replaced by strictly less than (<). In another aspect, the default technique 420 may be the sole technique used to calculate QpAdj.

Buffer Fullness Falls Below Threshold Limit

Let [$Q_1$, $Q_2$, . . . $Q_m$] be m threshold values and [technique-$Q_1$, technique-$Q_2$, technique-$Q_m$] be the respective alternative techniques used to calculate the QpAdj. In other words, the rate control may select a particular technique from the alternative techniques based on the following and the selected technique will be used to calculate QpAdj:

```
If(buffer fullness <= Q₁)
    technique-Q₁ is used to calculate QpAdj;
else if(buffer fullness <= Q₂)
    technique-Q₂ is used to calculate QpAdj;
...
else if(buffer fullness <= Qₘ)
    technique-Qₘ is used to calculate QpAdj;
```

That is, the fullness of the buffer, e.g., BF, may be compared to a plurality of progressively increasing thresholds $Q_1$ to $Q_n$. When BF is less than one of the thresholds, e.g., $Q_i$, and greater than the previous threshold, e.g., $Q_{i-1}$, the corresponding technique, technique-$Q_i$, may be used to determine the QP adjustment value, QpAdj.

Case (i): diffBits>0

In one implementation, for a given value of diffBits, the QpAdj value for default technique>=the QpAdj value for technique-$Q_1$>= . . . the QpAdj value for technique-$Q_2$>=the QpAdj value for technique-$Q_m$.

Figure 10:
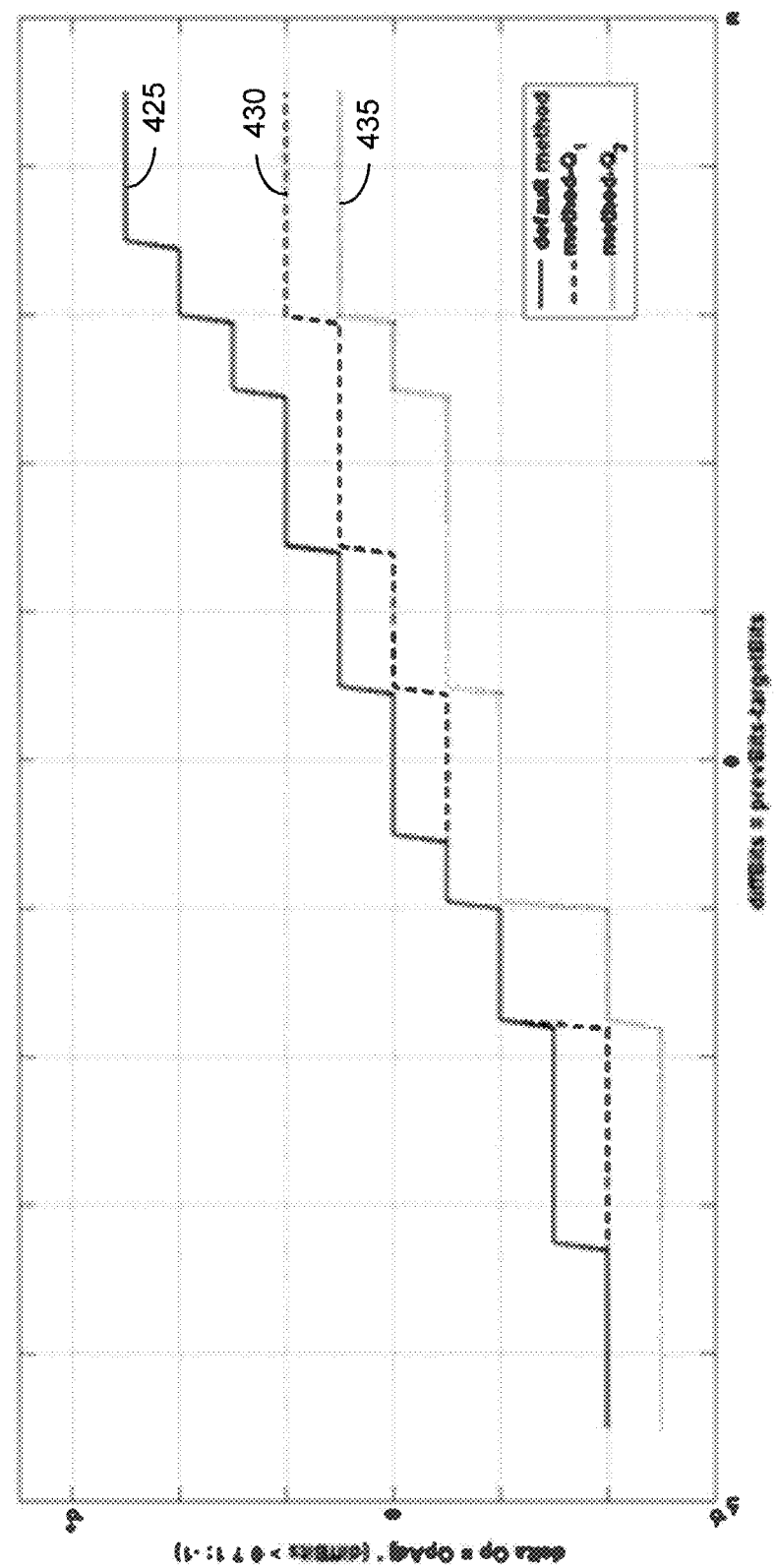
FIG. 10 shows yet another example approach to calculating the QP adjustment value.

FIG. 10 shows an illustration of one implementation of the default technique and two alternative technique, technique-$Q_1$, and technique-$Q_2$. The graph of FIG. 10 shows an example where delta Qp is a function of diffBits for the default technique 425, technique-$Q_1$ 430 and technique-$Q_2$ 435. With reference to FIG. 10, there is shown the relationship where m=2, and for a given value of diffBits>0, the QpAdj value for default technique 425>=the QpAdj value for technique-$Q_1$ 430>=the QpAdj value for technique-$Q_2$ 430.

In one implementation, when the same threshold K values are used to classify K+1 ranges as used in the default technique (as discussed above in connection with FIG. 3), for each range, the QpAdj value for default technique 425>=the QpAdj value for technique-$Q_1$ 430>=the QpAdj value for technique-$Q_2$ 435>= . . . the QpAdj value for technique-$Q_m$.

In one aspect, greater than or equal to (>=) may be replaced by strictly greater than (>). In another aspect, the default technique 425 may be the sole technique used to calculate QpAdj.

Case (ii): diffBits<=0

In one implementation, for a given value of diffBits, the QpAdj value for the default technique 425<=the QpAdj value for technique-$Q_1$ 430<=the QpAdj value for technique-$Q_2$ 435 . . . <=the QpAdj value for technique-$Q_m$.

With reference to FIG. 10, it is noted that the values of QpAdj are the same when the functions overlap, e.g., where the solid line and dashed line(s) overlap.

In one implementation, when same threshold J values are used to classify J+1 ranges as used in the default technique 425, for each range, the QpAdj value for the default technique 425<=the QpAdj value for technique-$Q_1$ 430<=the QpAdj value for technique-$Q_2$ 435 . . . <=QpAdj value for technique-$Q_m$.

In one aspect, less than or equal to (<=) may be replaced by strictly less than (<). It is noted that the examples shown in FIGS. 9-10 are merely for illustrative purposes, and that the actual technique or function for deriving delta Qp based on diffBits for each technique may be different depending on the particular implementation or context. In another aspect, the default technique 425 may be the sole technique used to calculate QpAdj.

Finally, it is noted that the techniques described herein may be applied for (1) explicit QP derivation and/or (2) implicit QP derivation. For example, in explicit QP derivation, the QP may be derived at the encoder 20 and explicitly signaled to the decoder 30 in the bitstream. In implicit QP derivation, both the encoder 20 and decoder 30 may derive the QP. However, the decoder 30 may utilize additional information to derive the QP, such as, for example, the type of QP technique, which may be signaled in the bitstream by the encoder 20. Other information that can be used to assist the decoder 30 in deriving the QP value may be signaled in the bitstream by the encoder 20 depending on the implementation.

In a first example, the techniques proposed herein may be used by the encoder 20 to calculate the QP by choosing an appropriate QP adaptation curve. The encoder 20 may explicitly signal the QP, for example, via signaling the differences between the current and previous block QPs. The encoder 20 may also signal the chosen QP adaptation curve.

In a second example, the techniques proposed herein may be used by both the encoder 20 and the decoder 30. The type of QP adaptation curve may be chosen by the encoder 20 and may be explicitly signaled in the bitstream.

Example Flowcharts for Determining Quantization Parameter (QP) Value

Figure 11:
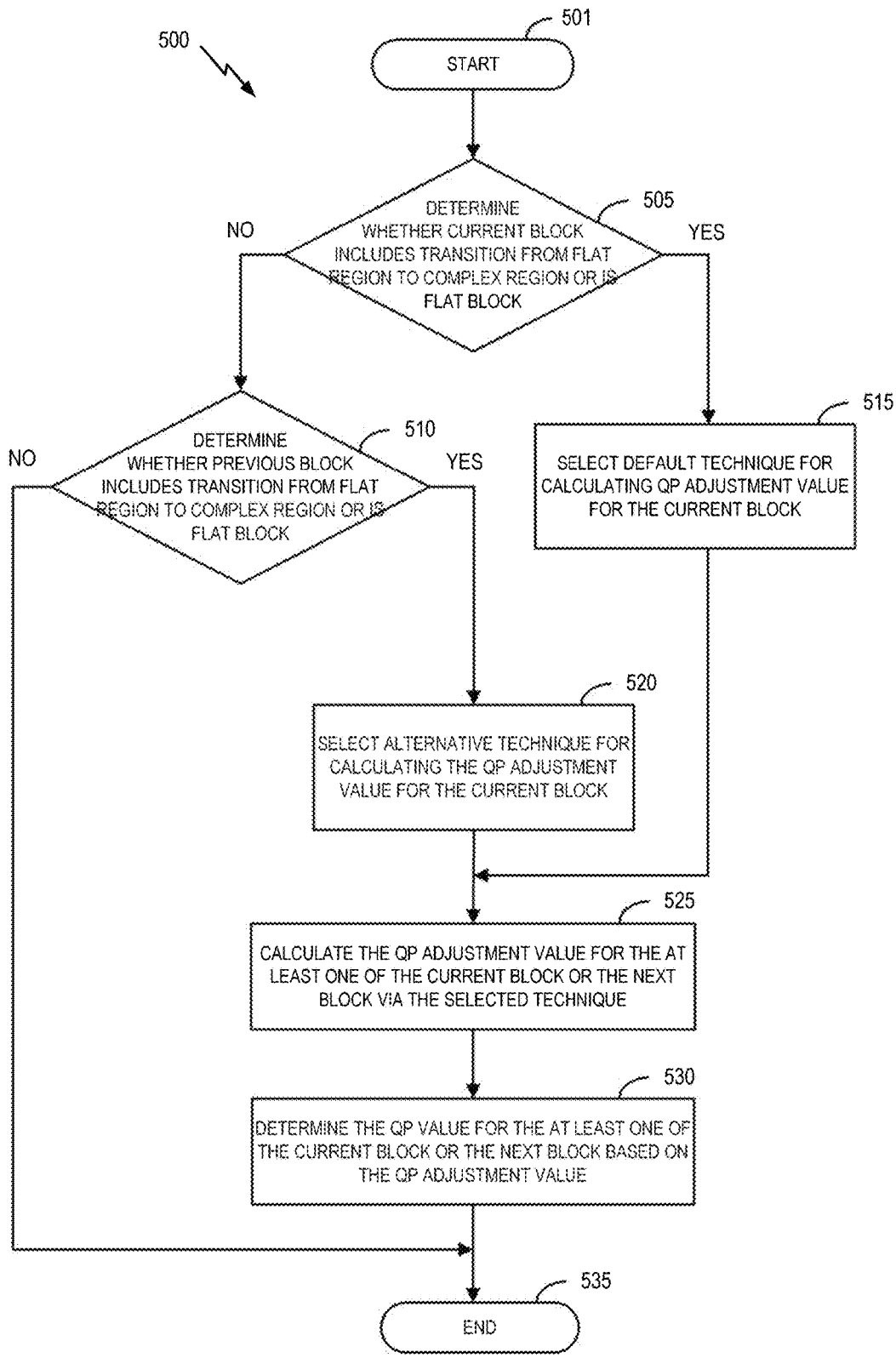
FIG. 11 is a flowchart illustrating a method for calculating a QP adjustment value in accordance with aspects described in this disclosure.

With reference to FIG. 11, an example procedure for determining a QP value will be described. FIG. 11 is a flowchart illustrating a method 500 for coding video data, according to an embodiment of the present disclosure. The steps illustrated in FIG. 11 may be performed by a video encoder (e.g., the video encoder 20 in FIG. 2A), a video decoder (e.g., the video decoder 30 in FIG. 2B), or component(s) thereof. For convenience, method 500 is described as performed by a video coder (also simply referred to as coder), which may be the video encoder 20, the video decoder 30, or another component.

The coder or component(s) thereof may be implemented on device that includes an integrated global memory shared by a plurality of programmable compute units that includes a buffer, wherein the buffer may include a first-in-first-out (FIFO) buffer. The device may further include an integrated circuit (IC) that may include at least one processor (e.g., a central processing unit (CPU)) and/or a graphics processing unit (GPU), wherein the GPU may include one or more programmable compute units.

The method 500 begins at block 501. At block 505, the coder determines whether a current block includes a transition from a flat region to a complex region or is a flat block. In certain implementations, this determination may include determining a complexity value for each of a previous block, the current block, and the next block and comparing the complexity values to a complexity threshold. If the coder determines that the current block includes a transition from a flat region to a complex region or is a flat block, the method proceeds to block 515. If the coder determines that the current block does not include a transition from a flat region to a complex region and is not a flat block, the method 500 proceeds to block 510. At block 510, the coder determines whether a previous block includes a transition from a flat region to a complex region or is a flat block. If the coder determines that the previous block includes a transition from a flat region to a complex region or is a flat block, the method 500 proceeds to block 520. If the coder determines that the pervious block does not include a transition from a flat region to a complex region and is not a flat block, the method 500 proceeds to block 535. Although not illustrated, in certain implementations, if the coder determines that the previous block does not include a transition from a flat region to a complex region or is not a flat block, the method may proceed to block 515. At block 515, the coder selects a default technique for calculating a QP adjustment value for the current block in response to determining that the current block includes either a transition from a flat region to a complex region or is a flat block.

At block 520, the coder selects an alternative technique for calculating the QP adjustment value for the current block at least partially in response to determining that the current block does not include a transition from a flat region to a complex region or is not a flat block. The coder may also select the alternative technique for calculating the QP adjustment value for the current block at least partially in response to determining that the previous block includes either a transition from a flat region to a complex region or is a flat block. At block 525, the coder calculates the QP adjustment value for the current block via the selected technique. At block 530, the coder determines the QP value for the current block based on the QP adjustment value. The method ends at block 535.

In the method 500, one or more of the blocks shown in FIG. 11 may be removed (e.g., not performed) and/or the order in which the method is performed may be switched. In some embodiments, additional blocks may be added to the method 500. The embodiments of the present disclosure are not limited to or by the example shown in FIG. 11, and other variations may be implemented without departing from the spirit of this disclosure.

Figure 12:
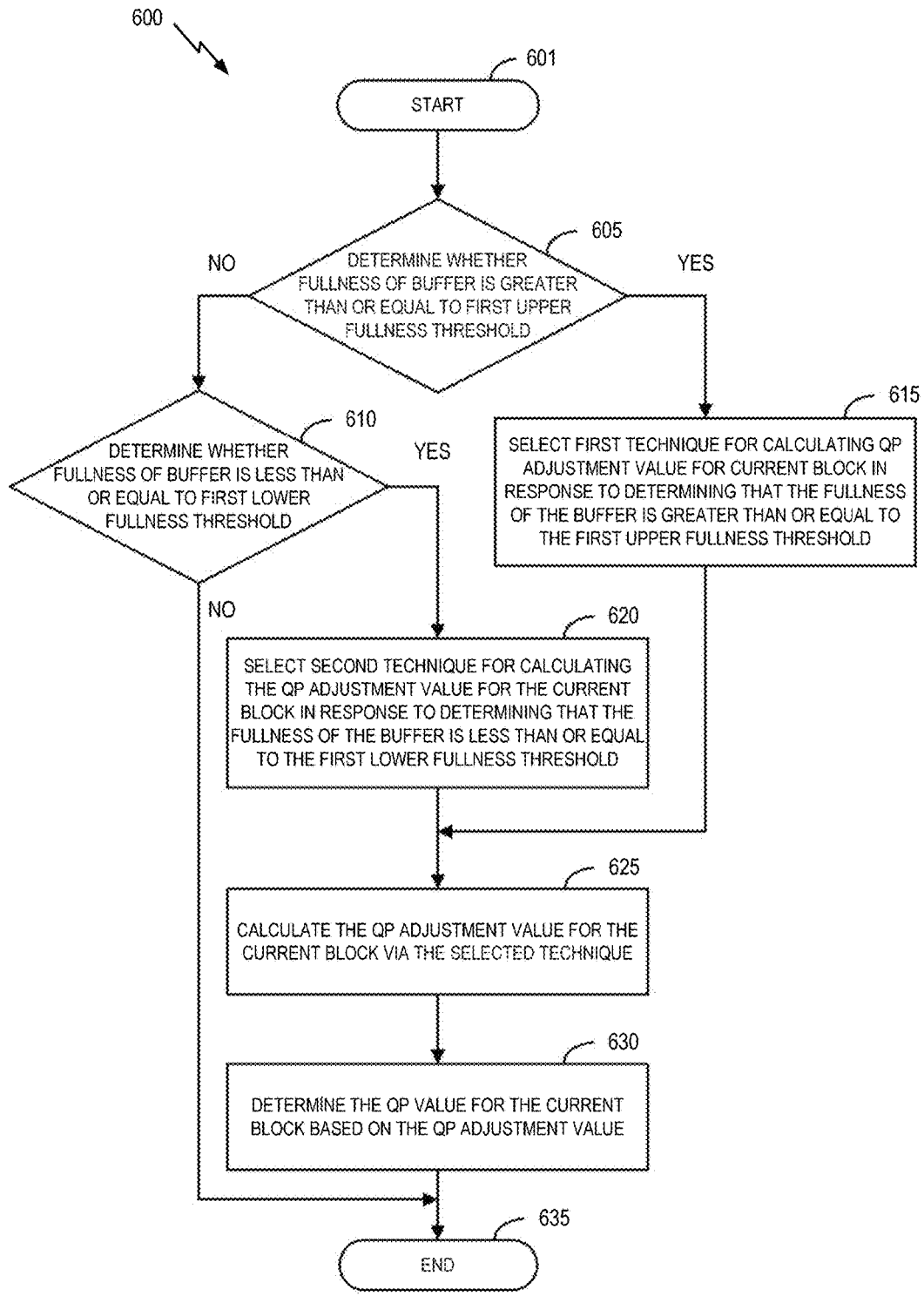
FIG. 12 is a flowchart illustrating a method for calculating a QP adjustment value in accordance with aspects described in this disclosure.

With reference to FIG. 12, another example procedure for determining a QP value will be described. FIG. 12 is a flowchart illustrating a method 600 for coding video data, according to an embodiment of the present disclosure. The steps illustrated in FIG. 12 may be performed by a video encoder (e.g., the video encoder 20 in FIG. 2A), a video decoder (e.g., the video decoder 30 in FIG. 2B), or component(s) thereof. For convenience, method 500 is described as performed by a video coder (also simply referred to as coder), which may be the video encoder 20, the video decoder 30, or another component.

The method 600 begins at block 601. At block 605, the coder determines whether a fullness of the buffer is greater than or equal to a first upper fullness threshold. If the coder determines the fullness of the buffer is greater than or equal to the first upper fullness threshold, the method 600 proceeds to block 615. If the coder determines the fullness of the buffer is less than the first upper fullness threshold, the method proceeds to block 610. At block 610, the coder determines whether the fullness of the buffer is less than or equal to a first lower fullness threshold. If the coder determines that the fullness of the buffer is less than or equal to the first lower fullness threshold, the method 600 proceeds to block 620. If the coder determines that the fullness of the buffer is greater than the first lower fullness threshold, the method 600 proceeds to block 635.

At block 615, the coder selects a first technique for calculating a QP adjustment value for a current block in response to determining that the fullness of the buffer is greater than or equal to the first upper fullness threshold. In certain implementations, the coder may select a default technique for calculating the QP adjustment value for the current block in response to determining that the fullness of the buffer is less than the first upper fullness threshold and greater than the first lower fullness threshold. In these implementations, the method 600 may proceed from block 610 to block 625.

At block 620, the coder selects a second technique for calculating the QP adjustment value for the current block in response to determining that the fullness of the buffer is less than or equal to the first lower fullness threshold. At block 625, the coder calculates the QP adjustment value for the current block via the selected technique. At block 630, the coder determines the QP value for the current block based on the QP adjustment value. The method 600 ends at block 635.

In the method 600, one or more of the blocks shown in FIG. 12 may be removed (e.g., not performed) and/or the order in which the method is performed may be switched. In some embodiments, additional blocks may be added to the method 600. The embodiments of the present disclosure are not limited to or by the example shown in FIG. 12, and other variations may be implemented without departing from the spirit of this disclosure.

Other Considerations

It should be noted that aspects of this disclosure have been described from the perspective of an encoder, such as the video encoder 20 in FIG. 2A. However, those skilled in the art will appreciate that the reverse operations to those described above may be applied to decode the generated bitstream by, for example, the video decoder 30 in FIG. 2B.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including applications in wireless communication device handsets, automotive, appliances, wearables, and/or other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an IC or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method for determining a quantization parameter (QP) value, comprising:
    determining whether a current block includes a transition from a flat region to a complex region or is a flat block;
    determining whether a previous block includes a transition from a flat region to a complex region or is a flat block;
    selecting a default technique for calculating a QP adjustment value for the current block in response to determining that the current block includes at least one of a transition from a flat region to a complex region or is a flat block;
    selecting an alternative technique for calculating the QP adjustment value for the current block in response to determining: i) that the current block does not include a transition from a flat region to a complex region and is not a flat block, and ii) that the previous block includes either a transition from a flat region to a complex region or is a flat block;
    calculating the QP adjustment value for the current block via the selected technique;
    determining the QP value for the current block based on the QP adjustment value; and
    determining a difference in the number of bits required to code the previous block and a target number of bits for the current block,
    wherein for a positive difference in the number of bits, the QP adjustment value calculated via the alternative technique is greater than the QP adjustment value calculated via the default technique.

2. The method of claim 1, further comprising:
  determining a complexity value for each of the previous block, the current block, and the next block,
  wherein the determining whether the current block includes a transition from a flat region to a complex region is based on the complexity values for the previous, current, and next blocks.

3. The method of claim 2, wherein the determining of whether the current block includes a transition from a flat region to a complex region is based on (i) the complexity value of the previous block being less than a complexity threshold, and (ii) the complexity value of the current block being greater than or equal to the complexity threshold.

4. The method of claim 1, further comprising:
  determining a plurality of QP adjustment values for a defined number of consecutive blocks via the alternative technique in response to determining that: i) the current block does not include a transition from a flat region to a complex region and is not a flat block, and ii) that the previous block includes at least include one of a transition from flat to complex region or is a flat block.

5. The method of claim 4, further comprising:
  determining whether one of the defined number of consecutive blocks is a flat block or contains a transition from complex region to a flat region; and
  terminating the determination of the QP adjustment values for the defined number of consecutive blocks via the alternative technique in response to determining that the one of the defined number of consecutive blocks is a flat block or contains a transition from complex region to a flat region.

6. The method of claim 5, wherein for a negative or zero difference in the number of bits, the QP adjustment value calculated by the alternative technique is less than the QP adjustment value calculated by the default technique.

7. A method for determining a quantization parameter (QP) value for coding video data with a fixed rate buffer, comprising:
  determining whether a fullness of the buffer is (i) greater than or equal to a first upper fullness threshold, or (ii) less than or equal to a first lower fullness threshold;
  selecting a first technique for calculating a QP adjustment value for a current block in response to determining that the fullness of the buffer is greater than or equal to the first upper fullness threshold;
  selecting a second technique for calculating the QP adjustment value for the current block in response to determining that the fullness of the buffer is less than or equal to the first lower fullness threshold;
  calculating the QP adjustment value for the current block via the selected technique;
  determining the QP value for the current block based on the QP adjustment value; and
  determining a difference in the number of bits required to code the previous block and a target number of bits for the current block,
  wherein for a positive difference in the number of bits, the QP adjustment value calculated via the second technique is greater than the QP adjustment value calculated via the first technique.

8. The method of claim 7, further comprising selecting a default technique for calculating the QP adjustment value for the current block in response to determining that the fullness of the buffer is less than the first fullness threshold and greater than the second fullness threshold.

9. The method of claim 7, further comprising:
  determining whether the fullness of the buffer is greater than or equal to a plurality of progressively increasing upper fullness thresholds, the upper fullness thresholds respectively corresponding to a plurality of techniques of a first type; and
  determining a difference in the number of bits required to code a previous block and a target number of bits allocated for the current block,
  wherein in response to the difference in the number of bits being greater than zero, the QP adjustment values are calculated by the first techniques progressively increase in the order that the corresponding upper fullness thresholds progressively increase.

10. The method of claim 9, wherein in response to the difference in the number of bits being less than or equal to zero, the QP adjustment values are calculated by the first techniques progressively decrease in the order that the corresponding upper fullness thresholds progressively increase.

11. The method of claim 7, further comprising:
  determining whether the fullness of the buffer is greater than or equal to a plurality of progressively decreasing lower fullness thresholds, the lower fullness thresholds respectively corresponding to a plurality of techniques of a second type; and
  determining a difference in the number of bits required to code a previous block and a target number of bits for the current block,
  wherein in response to the difference in the number of bits being greater than zero, the QP adjustment values are calculated by the second techniques progressively increase in the order that the corresponding lower fullness thresholds progressively decrease.

12. The method of claim 11, wherein in response to the difference in the number of bits being less than or equal to zero, the QP adjustment values are calculated by the second techniques progressively decrease in the order that the corresponding lower fullness thresholds progressively decrease.

13. The method of claim 7, wherein the determining of the QP value for the current block further comprises:
  receiving a QP value for a previous block;
  determining a difference in the number of bits required to code a previous block and a target number of bits for the current block;
  determining the QP value for the current block based on a sum of the QP value for the previous block and the QP adjustment value in response to the difference in the number of bits required to code the previous block and the target number of bits for the current block being greater than zero; and
  determining the QP value for the current block based on a difference of the QP value for the previous block and the QP adjustment value in response to the difference in the number of bits required to code the previous block and the target number of bits for the current block not being greater than zero.

14. The method of claim 7, further comprising:
  categorizing the fullness of the buffer into a plurality of upper ranges between the first upper fullness threshold and a maximum buffer fullness;
  categorizing the fullness of the buffer into a plurality of lower ranges between the first lower fullness threshold and a minimum buffer fullness; and
  determining which of the upper or lower ranges to which the fullness of the buffer corresponds, wherein the calculating of the QP adjustment value for the current block is further based on the determined upper or lower range.

15. The method of claim 7, further comprising:
determining a difference in the number of bits required to code a previous block and a target number of bits for the current block,
wherein the calculating of the QP adjustment value for the current block is further based on the difference in the number of bits required to code the previous block and the target number of bits for the current block.

16. A device for determining a quantization parameter (QP) value, comprising:
a memory configured to store video data including a previous block and a current block; and
at least one processor circuit coupled to the memory and configured to:
determine whether the current block includes a transition from a flat region to a complex region or is a flat block;
determine whether the previous block includes a transition from a flat region to a complex region or is a flat block;
select a default technique for calculating a QP adjustment value for the current block in response to determining that the current block does includes at least one of a transition from a flat region to a complex region or is a flat block;
select an alternative technique for calculating the QP adjustment value for the current block in response to determining: i) that the current block does not include a transition from a flat region to a complex region and is not a flat block, and ii) that the previous block includes either a transition from a flat region to a complex region or is a flat block;
calculate the QP adjustment value for the current block via the selected technique;
determine the QP value for the current block based on the QP adjustment value; and
determine a difference in the number of bits required to code the previous block and a target number of bits for the current block,
wherein for a positive difference in the number of bits, the QP adjustment value calculated via the alternative technique is greater than the QP adjustment value calculated via the default technique.

17. The device of claim 16, wherein the processor circuit is further configured to:
determine a complexity value for each of the previous block, the current block, and the next block,
wherein the determining whether the current block includes a transition from a flat region to a complex region is based on the complexity values for the previous, current, and next blocks.

18. The device of claim 17, wherein the processor circuit is further configured to determine whether the current block includes a transition from a flat region to a complex region is based on (i) the complexity value of the previous block being less than a complexity threshold, and (ii) the complexity value of the current block being greater than or equal to the complexity threshold.

19. The device of claim 16, wherein the processor circuit is further configured to:
determine a plurality of QP adjustment values for a defined number of consecutive blocks via the alternative technique in response to determining that: i) the current block does not include a transition from a flat region to a complex region and is not a flat block, and ii) that the previous block includes at least include one of a transition from flat to complex region or is a flat block.

20. The device of claim 19, wherein the processor circuit is further configured to:
determine whether one of the defined number of consecutive blocks is a flat block or contains a transition from complex region to a flat region; and
terminate the determination of the QP adjustment values for the defined number of consecutive blocks via the alternative technique in response to determining that the one of the defined number of consecutive blocks is a flat block or contains a transition from complex region to a flat region.

21. A device for determining a quantization parameter (QP) value for coding video data, comprising:
a fixed rate buffer circuit;
a memory configured to store the video data including a current block; and
at least one processor circuit coupled to the memory and configured to:
determine whether a fullness of the buffer circuit is (i) greater than or equal to a first upper fullness threshold, or (ii) less than or equal to a first lower fullness threshold;
select a first technique for calculating a QP adjustment value for the current block in response to determining that the fullness of the buffer is greater than or equal to the first upper fullness threshold;
selecting a second technique for calculating the QP adjustment value for the current block in response to determining that the fullness of the buffer is less than or equal to the first lower fullness threshold;
calculating the QP adjustment value for the current block via the selected technique;
determining the QP value for the current block based on the QP adjustment value; and
determining a difference in the number of bits required to code the previous block and a target number of bits for the current block,
wherein for a positive difference in the number of bits, the QP adjustment value calculated via the first technique is greater than the QP adjustment value calculated via the second technique.

22. The device of claim 21, wherein the processor circuit is further configured to select a default technique for calculating the QP adjustment value for the current block in response to determining that the fullness of the buffer is less than the first fullness threshold and greater than the second fullness threshold.

23. The device of claim 21, wherein the processor circuit is further configured to:
determine whether the fullness of the buffer is greater than or equal to a plurality of progressively increasing upper fullness thresholds, the upper fullness thresholds respectively corresponding to a plurality of techniques of a first type; and
determine a difference in the number of bits required to code a previous block and a target number of bits allocated for the current block,
wherein in response to the difference in the number of bits being greater than zero, the processor circuit is further configured to calculate the QP adjustment values by the first techniques progressively increase in the order that the corresponding upper fullness thresholds progressively increase.

24. The device of claim 23, wherein in response to the difference in the number of bits being less than or equal to zero, the processor circuit is further configured to calculate the QP adjustment values by the first techniques progressively decrease in the order that the corresponding upper fullness thresholds progressively increase.

25. The device of claim 21, wherein the processor circuit is further configured to:
    determine whether the fullness of the buffer is greater than or equal to a plurality of progressively decreasing lower fullness thresholds, the lower fullness thresholds respectively corresponding to a plurality of techniques of a second type; and
    determine a difference in the number of bits required to code a previous block and a target number of bits for the current block,
    wherein in response to the difference in the number of bits being greater than zero, the processor circuit is further configured to calculate the QP adjustment values by the second techniques progressively increase in the order that the corresponding lower fullness thresholds progressively decrease.

26. The device of claim 25, wherein in response to the difference in the number of bits being less than or equal to zero, the processor circuit is further configured to calculate the QP adjustment values by the second techniques progressively decrease in the order that the corresponding lower fullness thresholds progressively decrease.

27. The device of claim 21, wherein the processor circuit is further configured to:
    receive a QP value for a previous block;
    determine a difference in the number of bits required to code a previous block and a target number of bits for the current block;
    determine the QP value for the current block based on a sum of the QP value for the previous block and the QP adjustment value in response to the difference in the number of bits required to code the previous block and the target number of bits for the current block being greater than zero; and
    determine the QP value for the current block based on a difference of the QP value for the previous block and the QP adjustment value in response to the difference in the number of bits required to code the previous block and the target number of bits for the current block not being greater than zero.

28. The device of claim 21, wherein the processor circuit is further configured to:
    categorize the fullness of the buffer into a plurality of upper ranges between the first upper fullness threshold and a maximum buffer fullness;
    categorize the fullness of the buffer into a plurality of lower ranges between the first lower fullness threshold and a minimum buffer fullness; and
    determine which of the upper or lower ranges to which the fullness of the buffer corresponds,
    wherein the processor circuit is further configured to calculate the QP adjustment value for the current block based on the determined upper or lower range.

* * * * *